United States Patent [19]

Gross

[11] 4,024,435
[45] May 17, 1977

[54] GROUND FAULT PROTECTIVE SYSTEMS WITH VARIABLE RATE INTEGRATION OF FAULT SIGNALS

[76] Inventor: Thomas A. O. Gross, Concord Road, R.F.D., Lincoln, Mass. 01773

[22] Filed: Dec. 5, 1974

[21] Appl. No.: 529,704

[52] U.S. Cl. .................................. 361/45; 328/143
[51] Int. Cl.² ......................................... H02H 3/28
[58] Field of Search ............... 317/18 D, 36 TD; 328/142, 143, 145

[56] References Cited

UNITED STATES PATENTS

| | | |
|---|---|---|
| 3,339,114 | 8/1967 | Kelley et al. .................. 317/36 TD |
| 3,551,694 | 12/1970 | Boxall .............................. 328/142 |
| 3,723,814 | 3/1973 | Gross .............................. 317/18 D |
| 3,733,517 | 5/1973 | Wilson ........................... 317/18 D |
| 3,899,717 | 8/1975 | Legatti et al. .................. 317/18 D |

*Primary Examiner*—Harry E. Moose, Jr.
*Attorney, Agent, or Firm*—William D. Roberson

[57] ABSTRACT

To minimize nuisance tripping for spurious causes in ground fault protective systems, fault-characterizing signals derived from differential currents in alternating current supply lines are subjected to a variable integration automatically adapted to the magnitude of the fault-characterizing signal. Higher level signals are integrated at augmented rates, preferably with an antilog characteristic. The supply circuit is interrupted when the expanded and integrated signal exceeds a threshold value.

13 Claims, 4 Drawing Figures

GROUND FAULT PROTECTIVE SYSTEMS WITH VARIABLE RATE INTEGRATION OF FAULT SIGNALS

BACKGROUND

Ground fault interrupter systems are intended to sense small differences in current in normally balanced power lines. These differences may be caused by leakages of current from one of the line conductors to ground, thus depriving the neutral line of some of its normal current which could establish a balance or zero difference in curent in the lines at the sensor. If the differential currents are below predetermined levels, power should normally be allowed to flow uninterrupted. If larger differential current occur, the circuit should be interrupted, since it is then probable that a malfunction of insulation or perhaps even a serious shock to a human being is occurring. Some such ground fault interrupter systems are described and claimed in my U.S. Pat. No. 3614534, issued Oct. 19, 1971 on improvements in "Ground Fault Responsive Electrical Protective Systems."

In practical field use of ground fault interrupters it is possible for spurious signals to be confused with real fault currents. For example, power line transients due to sudden load changes or to lightning-induced surges can give rise to nuisance tripping in ground fault interrupter systems. In tolerance to frequent nuisance tripping can cause the users of such equipment to establish sensitivity specifications at dangerously high levels. A steady-state spurious signal frequently encountered is a capacitive current from the high line side to ground. This can be caused by a long buried cable or by discrete capacitors used to avoid radio frequency interference or by similar circuit influences having nothing to do with a fault on the line. The minimization of nuisance tripping in ground fault interrupter systems by discriminating against reaction currents, spurious transients or other electrical signals having a wave form which does not correspond to or correlate in phase with the line voltage is addressed in another of my U.S. Pat. No. 3723814, issued Mar. 27 1973 and entitled "Phase-Sensitive Ground Fault Protective Systems."

The present invention is also concerned with the problem of nuisance tripping in ground fault protective systems. The term "nuisance tripping" implies, of course, that interruption of the circuit is brought about by the ground fault detector and interrupter system for causes which prove to be insufficient, that the system responds to electrical conditions by needlessly breaking the circuit without the occurence of a true fault. A true ground fault can have different causes and can give rise to different levels of current imbalance in the supply conductors. If the current imbalance is comparatively high, that is to say, if a comparatively large ground fault current flows, the system should respond quickly and decisively. But if the current imbalance in the supply lines is comparatively small, it is not necessarily desirable for the system to respond as quickly to the signal condition. Under such circumstances the decision to interrupt the supply circuit can be deferred, in a manner of speaking, to permit the system more time to test whether the current imbalance in the supply conductors is a short-term anomaly or a longer term effect representing an actual or incipient ground fault.

Despite the belief by some that a ground fault system should interrupt with a uniform time delay regardless of the magnitude of the fault current, it can be demonstrated than an ideal ground fault system designed to operate safely with a minimum of nuisance tripping should respond with different time delays, depending upon the magnitude of the differential currents in the supply conductors. Ideally, the response time should have an antilog characteristic with respect to the fault-characterizing signals derived from the supply lines. To provide such a system is among the objectives of the present invention.

One embodiment of the present invention achieves this objective by augmenting of expanding ground fault signals at higher signal levels and integrating th expanded signal at rates which are disproportionately higher for higher signal levels than for lower signal levels. Interruption of the supply circuit is in response to the expanded and integrated ground fault signals. Another embodiment achieves this same objective by means of a specially adapted integrator giving an enhanced response to strong signals of short duration. Such an integrator in combination with a succeeding threshold device provides a similarly augmented and faster response to higher signal levels than to lower signal levels.

INTRODUCTION OF THE DRAWINGS

Further details of the invention as well as additional advantages will be better understood in connection with the accompanying drawings wherein.

DETAILED DESCRIPTION

Figure 1:
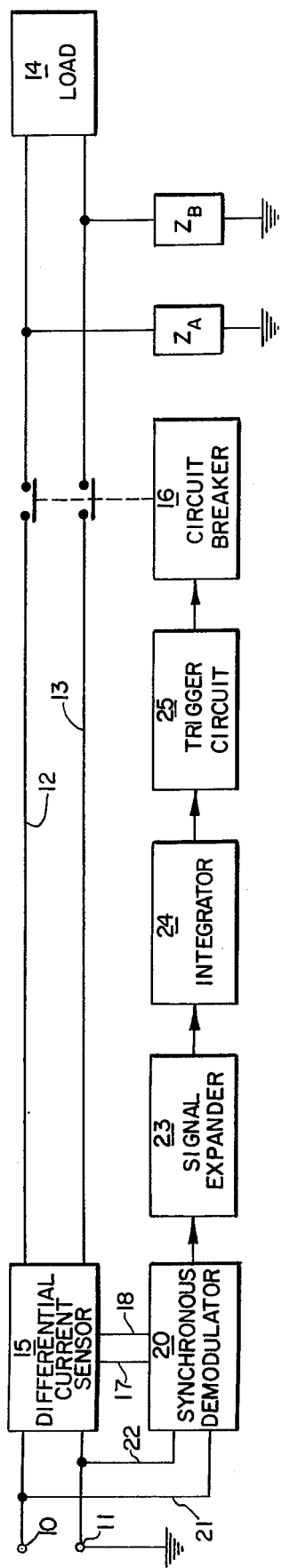
FIG. 1 is a block diagram of an improved ground fault protective system constructed in accordance with my invention.

To illustrate the principles of this invention, the simplified block diagram of FIG. 1 will serve as a generalized example of a ground fault detecting and circuit interrupting system constructed according to the principles of this invention. Supply terminals 10 and 11 are intended to be connected to a source of alternating current potentials for supplying electrical power over conductors 12 and 13 to any suitable load represented generally at 14. Supply conductors 12 and 13 pass through a differential current sensor 15 and the contacts of circuit breaker 16, although not necessarily in that particular order. Differential current sensor 15 responds to currents in conductors 12 and 13 to generate a signal over connections 17 and 18 responsive to any difference in currents in the supply conductors. Under normal system functioning, the currents in one conductor are equal and opposite to those in the other conductor and the differential current sensor 15 generates no output signal.

In FIG. 1 two potential trouble points are represented by impedances $Z_a$ and $Z_b$ respectively. These represent possible paths for current to flow to ground from either side of the load 14. A current in either of these hypothesized impedances bypasses the normal current path back to the grounded supply terminal 11. This results in a difference between the currents in conductors 12 and 13. Thereupon the differential current sensor 15 generates a signal characterizing the ground fault. This signal can have different phase relationships to the phase of the source, depending on whether the ground fault is reactive or resistive or both.

Although not essential to the practice of the present invention, a synchronous demodulator 20 is preferably connected to receive the ground fault characterizing signals over lines 17 and 18; it also receives a reference signal over lines 21 and 22 from the supply conductors 12 and 13. The synchronous demodulator 20 demodulates the ground fault characterizing signal against the reference signal to generate an in-phase ground fault signal representing the resistive component of the ground fault characterizing signal, as described and claimed in my aforesaid U.S. Pat. No. 3,723,814.

In accordance with the present invention the fault signal, whether synchronously demodulated or not, is supplied to a signal expander 23 which performs an operation upon the fault signal to produce a more than proportional response to the magnitude of the input signal. In a currently preferred embodiment of the invention the signal expander may take the form of a diode-resistor network constructed to enhance or augment the ground fault signal exponentially. It is this enhanced or augmented ground fault signal which is summed by integrator 24, the time constant of which is selected to bleed off input signals of an inconsequential level such as 5 ma. or less. When the integrated augmented ground fault signal exceeds a predetermined threshold level the trigger circuit 25 actuates circuit breaker 16 to interrupt continuity in the supply conductors.

Figure 2:
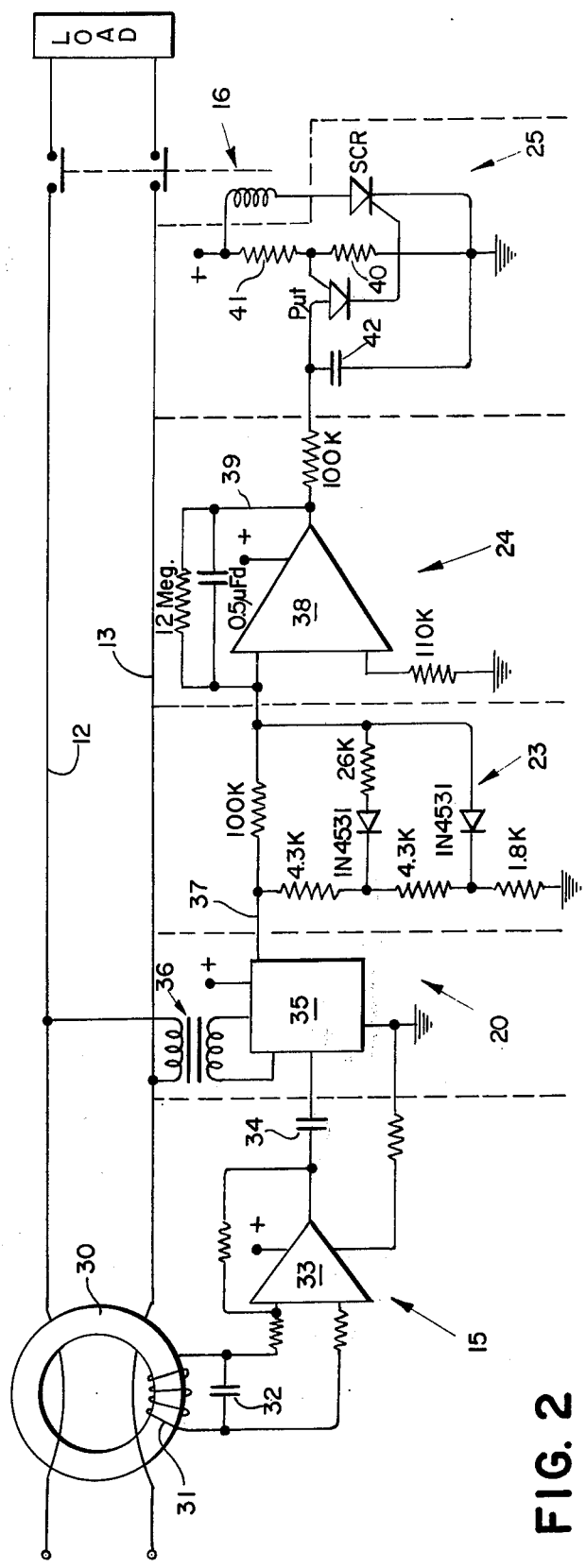
FIG. 2 is a circuit diagram corresponding to the system of FIG. 1 with additional details illustrating a preferred form of this invention.

In FIG. 2 is shown a circuit diagram representing a preferred form of this invention wherein dotted lines are included to represent approximate divisions of the circuit into functional groups corresponding to the blocks in the previous block diagram. Inspection of this circuit will show it to be simplified for clarity. For example, the power supply and biasing connections for the various integrated circuits have been omitted. In this circuit the differential current sensor 15 includes a familiar form of core structure 30 through which the supply conductors 12 and 13 pass. On this core structure a secondary winding 31 derives a signal only when a difference in current flows in the supply conductors. The capacitor 32 across the secondary winding is included to tune the circuit. Any signal derived by the secondary winding is preferably amplified by a high impedance amplifier 33, preferably in the form of an integrated circuit. The amplified signal is coupled through capacitor 34 to the synchronous demodulator 20 incorporating an integrated circuit phase detector 35. The latter derives phase information from the supply conductors through a transformer 36. This transformer may, if desired, be provided with an additional secondary winding (not shown) from which a potential may be derived for a power supply to provide operating potentials for the various components of the circuit. The coupling capacitor 34, which introduces some phase shift of its own, is selected or adjusted in size to compensate for other phase errors which may be introduced through the connections to transformer 36.

As mentioned before, the synchronous demodulator 20 is not essential to the practice of this invention but is especially desirable to minimize purely reactive components of the fault signal appearing at the input connection 37 to the signal expander 23. In any event the ground fault signal appearing at the input to the signal expander will preferably have undergone an amplification to about minus 20 millivolts per milliampere of fault current. It is for this degree of amplification that the component values shown in the signal expander network 23 are relevant.

In this embodiment the input signal to the signal expander appears across a voltage divider of two 4.3 K resistors and a 1.8 K resistor. A resistor of 100 K provides an attenuated first signal path to integrator 24 for low ground fault signal levels. Across the latter resistor is a parallel circuit branch providing a second signal path to the integrator and which includes the first resistor of the voltage divider in series with a type 1N4531 diode and a 26 K resistor. A third signal path to the integrator is traceable through both 4.3 K resistors and another type 1N4531 diode.

The alternate signal paths provided by the expander are obviously not mutually exclusive. The 100 K resistor path provides a continous path in which the current increases with increases in fault signals levels. At a fault signal of approximately =0.68 v (representing 34 ma. fault current) the second path begins to conduct. At this point the potential drop across the first diode is approximately 0.4 v. The silicon diodes selected are characteristically soft diodes which do not snap into conduction but which develop increasing forward drop as the signal strength increases. At a ground fault signal potential of about 2.3 v (representing 115 ma. fault current) the second diode begins to conduct. Hence as the ground fault signal increases through progressively higher levels, there is an automatic, progressive and disproportionate increase in the magnitude of the signal presented to the integrator 24.

The effect of the expander network 23 is to augment the integration of high level ground fault signals by intergators 24 or, to put it another way, to increase the sensitivity of the integrator to strong fault signal levels. The importance of this expanded sensitivity is dealt with further below in connection with certain physiological factors involved in accidential electrocution.

The expanded ground fault signal may be integrated in any circuit convenient for this purpose. Here an active integrator is shown as preferred and comprises an integrated circuit operational amplifier 38 with differential inputs and a feedback path 39 from the output of one of the inputs. The feedback path incorporates an integrating capacitor of 0.5 microfarad paralleled by a high resistance of 12 megohms to achieve a desired time constant of about six seconds. The output of the integrator is delivered through a resistor of 100 K to the trigger circuit 25.

Many forms of trigger circuit may be employed to determine the threshold potential at which the expanded integrated ground fault signal causes the circuit breaker 16 to open the supply circuit. In the trigger circuit 25 shown here a programmable unijunction transistor PUT is employed having an adjustable breakdown potential achieved when the potential across the PUT exceeds the potential on the trigger electrode from the voltage divider 40, 41. When the PUT threshold is exceeded the resulting current through the silicon controlled rectifier SCR trigger electrode suddenly causes the SCR to conduct, thereby energizing the winding of the circuit breaker 16. The circuit breaker is preferably a spring loaded resettable contactor normally latched in the closed condition and unlatched to open when energized.

A capacitor 42 of 0.1 microfarad connected to ground from the output of the integrator 24 performs multiple functions. One of these is to provide a supplemental integration function. More important however is the use of this capacitor as a source of energy to trigger the SCR decisively. In addition this capacitor with the 100 K output resistor of the integrator acts as a low pass filter to isolate amplifier 38 from potential transients caused by the sharp triggering of the PUT and SCR.

Figure 3:
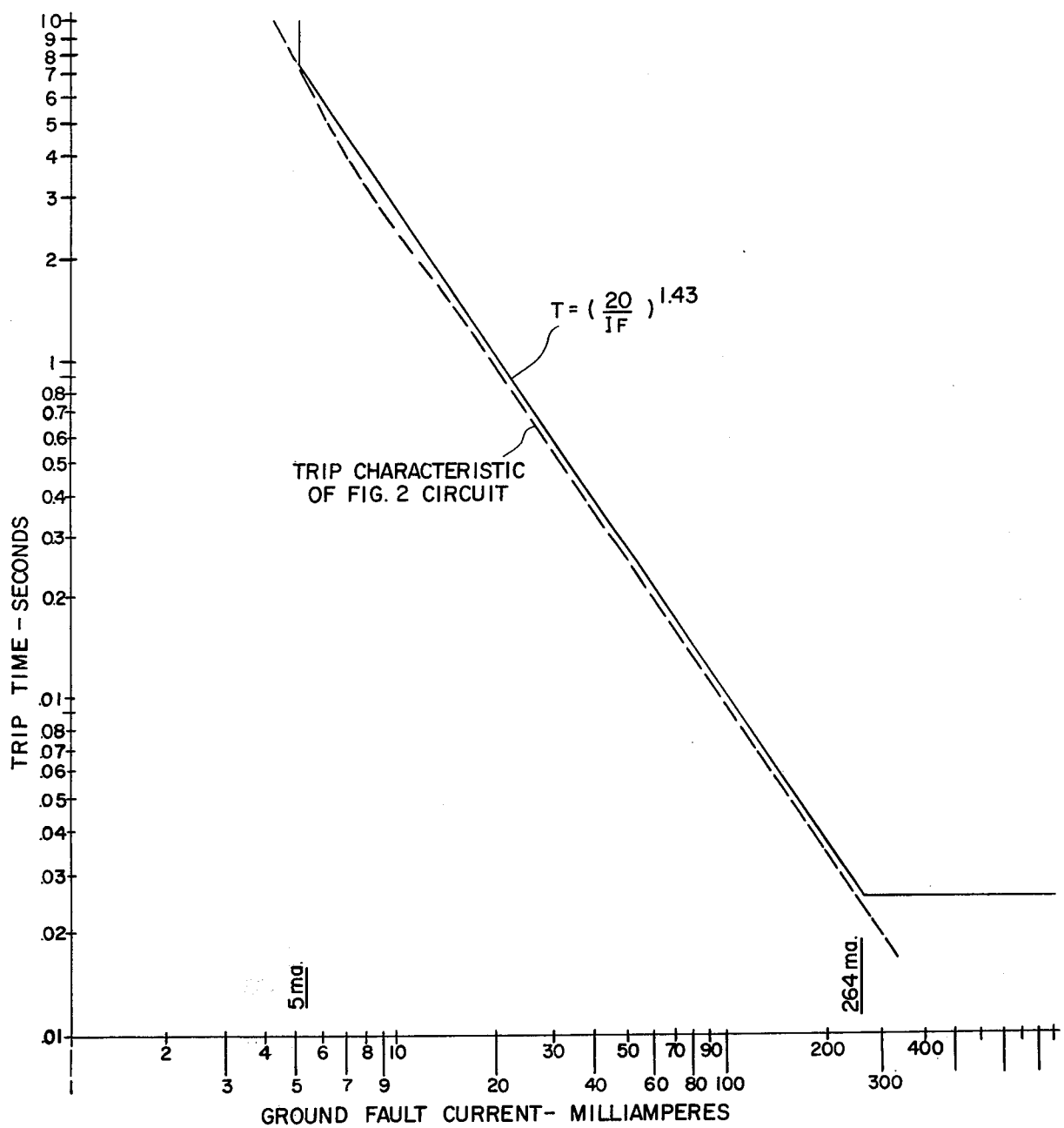
FIG. 3 is a graph in logarithmic coordinates showing the time taken by the system of FIG. 2 to interrupt the supply circuit in response to different levels of ground fault current.

In FIG. 3 is shown a characteristic curve in logarithmic coordinates demonstrating the performance of the system shown in FIG. 2. The abscissa represents the ground fault current in milliamperes and the ordinate identifies the amount of time required to trip the circuit breaker upon occurrence of the specified ground fault. The dashed line curve is characteristic of the performance of the FIG. 2 circuit and the adjacent solid line curve represents the equation:

$$T = (20/I_f)^{1.43} \qquad \text{Eq. 1}$$

where $T$ is time in seconds and $I_f$ is fault current expressed in milliamperes. It can be seen how closely the characteristic curve matches that of the equation between the 5 ma. lower ground fault current limit and the 264 ma. upper limit. There are good reasons for this.

Between the specified upper and lower limits Equation 1 represents the maximum allowable time for a Class A ground-fault circuit interrupter to interrupt a circuit to a load under the current Standard for Ground-fault Circuit Interrupters issued by Underwriters' Laboratories on Dec. 11, 1972 as UL 943.

The Underwriters' Laboratories Standard referred to above has undoubtedly been profoundly influenced by knowledge of the physiology of electrocution. For example, the "let-go" current level above which a person experiencing an electrical shock cannot voluntarily release his hold on a physical object through which he received the shock varies according to a number of factors. These variable factors include the weight of the person. Larger people exhibit higher "let-go" currents. The let-go current for most people is between 10 and 16 ma. But the lower limit of let-go current seems to be 6 ma., at which current level 0.5% of women cannot let go of the object through which they are experiencing electrical shock. Hence, a lower limit of 5 ma. in the Underwriters' Laboratories Standard for Class A circuit breakers appears to be amply justified.

In a typical situation involving possible electrocution of an individual completing a ground fault circuit through his own body, death does not occur instantaneously, but results most often from ventricular fibrillation. The higher the electrocuting current is, the shorter the time in which ventricular fibrillation occurs. It is my understanding that the time $T_{vf}$, in which ventricular fibrillation occurs may be represented by the simple equation:

$$T_{vf} = k/I^2 \qquad \text{Eq. 2}$$

where $I$ is the electrocuting current and $k$ is a factor which may vary within the limits from one individual to another. The point to be observed is that as the current increases, the time period in which serious physical damage can occur shortens exponentially. Reasons such as this must certainly have led to the antilog envelope of the Underwriters' Laboratories Standard. Currently available ground fault interrupter systems with which I am aware come nowhere close to approximately this Standard. To be sure, all such systems which are now commercially available in the U.S.A. have trip times no longer than those specified in this Standard, but their trip times are typically far shorter than necessary over a major part of the range from 5 ma. to 264 ma. As a result, such systems are plagued by nuisance tripping.

A protective system which is subject to frequent nuisance tripping can actually be dangerous in the long run. When a protective system needlessly and repeatedly interrupts electrical power because of undue sensitivity to transients or to other signal conditions which do not truly represent a fault, there is a temptation for the use to bypass or defeat the protective system. Therein lies the danger.

It has been reported authoritatively that a signal detection system in which the integration time is doubled exhibits an order of magnitude reduction in its false alarm rate. (See, for example, Steenson and Stirling: The Amplitude Distribution and False-Alarm Rate of Filtered Noise, I.E.E.E. Proceedings, January 1965.) This invention permits the trip characteristic of a ground fault protective system to be tailored to the needs of the installation, with delay periods until the instant of circuit interruption as long as may be permissible at any ground fault current level, but no longer. The result is a safe system substantially free of nuisance tripping.

The invention is capable of a number of modifications and variations in its possible embodiments. For example, the diode and resistance network in the signal expander 23 of FIG. 2 has three channels through which progressively higher signals may flow. But the number of diode-resistor channels may be varied depending upon the degree to which the trip characteristics are to be matched to an idealized, antilog curve. In the preferred example illustrated in FIG. 2, the functions of the expander 23 and of the integrator 24 are performed by separate sub-circuits. It is possible for the invention to be embodied in a system wherein a combined integrator-expander performs both functions.

Figure 4:
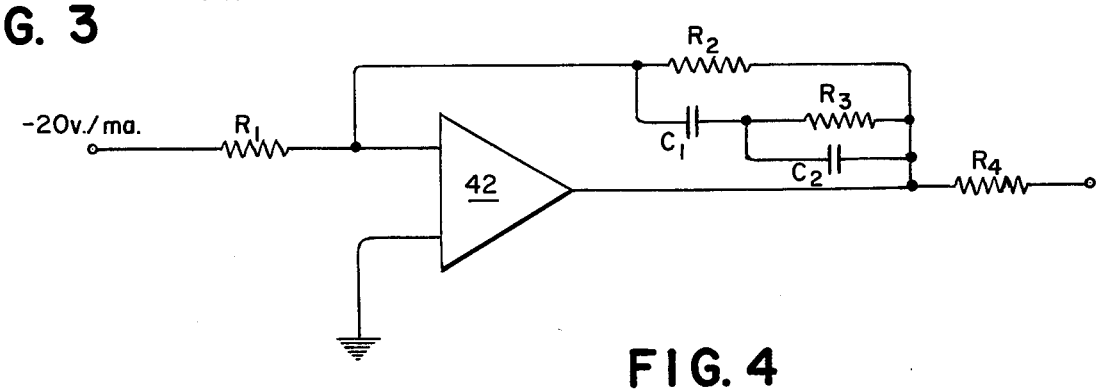
FIG. 4 is a partial circuit diagram of a variable rate integrator useful in an alternate embodiment of the invention.

For example in FIG. 4 is illustrated a partial circuit diagram of an variable rate integrator which may be substituted for the expander 23 and the integrator 24 of FIG. 2. With appropriate choice of circuit values this circuit can approach the performance of the circuit previously described. It does so by variable rate integration. The input resistor $R_1$ is 100 K as in the previous example. Connected in the feedback path around the operational amplifier 42 are two series-connected integrating capacitors $C_1$ and $C_2$ having the values 0.5 mfd and 0.1 mfd respectively. Shunting the combination of capacitors is resistor $R_2$ of 3 Megohms, while the resistor $R_3$ shunting capacitor $C_2$ has a value of 215 K. The output resistor $R_4$ has a value of 100 K.

During the first few milliseconds following a signal pulse this variable rate integrator functions as an ideal one with an integrating capacitor of 0.0833 mfd (0.5 and 0.1 in series). The effect of $C_2$ is to increase the initial gain by sixfold, and a faster response to strong signals is facilitated. After about 25 milliseconds most of the current flowing in the feedback circuit is in $R_3$ which is the principal gain-determining impedance between 25 and 100 milliseconds. The gain of the integrator for signals of this duration is approximately:

$$\text{Gain} = R_3/R_1 = -2.15 \qquad \text{Eq. 3}$$

For long peiods $R_2$ becomes dominant; above 7 seconds:

$$\text{Gain} = R_2/R_1 = -30 \qquad \text{Eq. 4}$$

This variable gain integrator, when used with a fault signal detector having an amplification factor of −20 millivolts per milliampere of ground fault current, develops according to Eq. 4 an output of +3 volts in response to a 5 miliampere fault of long duration. If the succeeding threshold device is set to trigger at +3 volts, the system trips the circuit breaker in accordance with the low-current, long-time end of the curve shown in FIG. 3. In the midrange of fault currents, or about 70 milliamperes, the gain-adapted integrator develops according to Eq. 3 the necessary +3 volt triggering output in a disproportionately shorter period of time in close approximation to the trip permitted by the envelope of Eq. 1. Such a performance contrasts markedly with that of a conventional integrator lacking either the augmented gain-time modification provided by $R_3C_2$ or a separate signal expander such as shown in FIG. 2.

In these examples we have seen the automatically expansion of higher level ground signals to allow the storage or integration of such signals at disproportionately augmented antilogarithmic rates. Many other variations in the implementation of this invention are possible in addition to those specifically shown and described. It should be understood that the foregoing examples are offered in an illustrative sense and the details of these embodiments should not limit the scope of this invention it its broader aspects.

I claim:

1. A ground fault protective system for use in a power distribution system for supplying a.c. power to a load from at least two supply conductors, one of such conductors being grounded at the source, comprising:
   differential current sensing means responsive to currents in such supply conductors for generating ground fault characterizing signals in response to difference in currents carried by such supply conductors;
   signal storage means responsive to said ground fault characterizing signals to provide an output signal which is an integral of said ground fault characterizing signals; and
   variable rate signal expander means associated with said signal storage means and automatically responsive to the magnitude of said ground fault characterizing signals for causing said ground fault characterizing signals to be integrated by said signal storage means at disproportionately augmented rates in response to higher signal levels than to lower signal levels.

2. The system of claim 1 further comprising means for interrupting continuity through such supply conductors in response to the attainment by said integrated output signal of a threshold value.

3. The system of claim 1 wherein the rates of signal integration provided by said signal expander means bear an antilog relationship to the levels of said ground fault characterizing signals.

4. A ground fault protective system for use in a power distribution system for supplying a.c. power to a load from at least two supply conductors, one of such conductors being grounded at the source, comprising:
   differential current sensing means responsive to currents in such supply conductors for generating ground fault signals in response to differences in currents carried by such supply conductors;
   signal expanding integrator means responsive to said ground fault signals and exhibiting a disproportionately enhanced response to higher ground signal levels than to lower ground fault signal levels for integrating said fault signals at antilogarithmic rates to produce an output signal; and
   means for interrupting continuity through such supply conductors when said output signal exceeds a predetermined threshold level.

5. A ground fault protective system for use in a power distribution system for supplying a.c. power to a load from at least two supply conductors, one of such conductors being grounded at the source, comprising:
   differential current sensing means responsive to currents in such supply conductors for generating ground fault signals in response to differences in currents carried by such supply conductors;
   signal expanding integrator means responsive to said ground fault signals for producing an integrated ground fault signal reaching a threshold value within a period of time inversely proportional to an exponential of the magnitude of said ground fault signals; and
   means responsive to the attainment by said integrated ground fault signal of said threshold value for interrupting continuity in said supply conductors.

6. A ground fault protective system for use in a power distribution system for supplying a.c. power to a load from at least two supply conductors, one of such conductors being grounded at the source, comprising:
   differential current sensing means responsive to currents in such supply conductors for generating ground fault signals in response to differences in currents carried by such supply conductors;
   integrator means responsive to said ground fault signals to produce an integrated ground fault signal; and
   signal expander means associated with said integrator means for causing the integrated ground fault signal of said integrator means to exhibit a disproportionately augmented response to higher ground fault signal levels than to lower ground fault signal levels than to lower ground fault signal levels.

7. The system of claim 6 further comprising:
   means for interrupting continuity through such supply conductors when said integrated ground fault signal exceeds a predetermined threshold level.

8. The system of claim 6 wherein the disproportionately augmented response of said signal expander means is antilogarithmic.

9. The system of claim 6 wherein said signal expander means comprises multiple signal paths to said integrator means, said signal paths becoming progressively conductive at successively higher ground fault signal levels.

10. The system of claim 6 wherein said signal expander means comprises multiple signal paths to said integrator means offering progressively lower attenuation of said ground fault signals at successively higher ground fault signal levels.

11. The system of claim 6 wherein said signal expander means comprises a network of resistances and one or more diodes offering an additional signal path for said ground fault signals to said integrator means when the signal potential across one of said diodes exceeds the forward potential drop of said one of said diodes, said additional signal path providing lower attenuation of said ground fault signals at higher ground fault signal levels.

12. A ground fault protective system for use in a power distribution system for supplying a.c. power to a load from at least two supply conductors, one of such conductors being grounded at the source, comprising:

differential current sensing means responsive to currents in such supply conductors for generating ground fault signals in response to differences in currents carried by such supply conductors;

integrator means responsive to said ground fault signals to produce an integrated ground fault signal; and signal expander means comprising an auxiliary R C network within said integrator means for automatically increasing the gain of said integrator means at increasing ground fault signal levels, thereby causing the integrated ground fault signal of said integrator means to exhibit a disproportionately augmented response to higher ground fault signal levels than to lower ground fault signal levels.

13. The system of claim 12 wheein said integrator means comprises an amplifier having a feedback path connected between the output and input sides thereof, said feedback path having a primary integrating capacitor therein, and wherein said auxiliary R C network comprises at least one secondary integrating capacitor in series with said primary integrating capacitor and resistance means shunting said secondary integrating capacitor.

* * * * *